United States Patent
Sypniewski

[11] Patent Number: 6,054,951
[45] Date of Patent: Apr. 25, 2000

[54] MULTI-DIMENSIONAL TRACKING SENSOR

[76] Inventor: Jozef Sypniewski, 7 Fletcher Cir., Hanover, N.H. 03755

[21] Appl. No.: 08/867,053

[22] Filed: Jun. 2, 1997

Related U.S. Application Data

[60] Provisional application No. 60/002,866, Aug. 28, 1995.

[51] Int. Cl.[7] .................................................. G01S 3/02
[52] U.S. Cl. .......................................... 342/465; 342/451
[58] Field of Search ..................................... 342/450, 451, 342/465

[56] References Cited

U.S. PATENT DOCUMENTS

| | | |
|---|---|---|
| 3,803,598 | 4/1974 | Abernathy et al. .................... 342/192 |
| 3,886,553 | 5/1975 | Bates . |
| 3,886,554 | 5/1975 | Braun et al. . |
| 3,889,266 | 6/1975 | Bartram ................................ 342/465 |
| 3,996,590 | 12/1976 | Hammack .............................. 342/465 |
| 4,054,881 | 10/1977 | Raab . |
| 4,298,874 | 11/1981 | Kuipers . |
| 4,314,251 | 2/1982 | Raab . |
| 4,328,548 | 5/1982 | Crow et al. . |
| 4,346,384 | 8/1982 | Raab . |
| 4,560,930 | 12/1985 | Kouno . |
| 4,622,644 | 11/1986 | Hansen . |
| 4,710,708 | 12/1987 | Rorden et al. . |
| 4,728,959 | 3/1988 | Maloney et al. . |
| 4,737,794 | 4/1988 | Jones . |
| 4,742,356 | 5/1988 | Kuipers . |
| 4,746,924 | 5/1988 | Lightfoot ................................ 342/453 |
| 4,777,329 | 10/1988 | Mallicoat . |
| 4,792,806 | 12/1988 | Bent et al. .............................. 342/465 |
| 4,812,812 | 3/1989 | Flowerdew et al. . |
| 4,829,250 | 5/1989 | Rotier . |
| 4,922,925 | 5/1990 | Crandall et al. . |
| 4,951,263 | 8/1990 | Shope . |
| 5,109,194 | 4/1992 | Cantaloube . |
| 5,111,187 | 5/1992 | Heckleman e al. . |
| 5,115,224 | 5/1992 | Kostusiak et al. . |
| 5,168,222 | 12/1992 | Volsin et al. . |
| 5,280,457 | 1/1994 | Figueroa et al. ........................ 367/127 |
| 5,315,308 | 5/1994 | Nehorai et al. . |
| 5,365,516 | 11/1994 | Tandrell ................................ 370/335 |
| 5,416,466 | 5/1995 | Malvaso et al. . |
| 5,467,074 | 11/1995 | Pedtke . |
| 5,483,223 | 1/1996 | Pedtke . |
| 5,523,740 | 6/1996 | Burgmann . |
| 5,570,099 | 10/1996 | Des Jardins ............................ 342/318 |
| 5,572,192 | 11/1996 | Berube . |
| 5,578,989 | 11/1996 | Pedtke . |
| 5,630,208 | 5/1997 | Enge et al. .............................. 455/65 |
| 5,790,076 | 8/1998 | Sypniewski ............................ 342/365 |

OTHER PUBLICATIONS

Garth, Lee M and Poor, Vincent H.; Detection of Non–Gaussian Signals: A Paradigm for Modern Statistical Signal Processing; Proceedings of the IEEE, vol. 82, No. 7, Jul. 1994; pp. 1061–1066.

Raab, Fedrick H. et al.; Magnetic Position and Orientation Tracking System; IEEE Transactions on Aerospeace and Electronic Systems, vol. AES–15, No. 5, Sep. 1979; pp. 709–718.

Foxlin, Eric and Durlach, Nathaniel; An Intertial Head–Orientation Tracker with Automatic Drift Compensation For Use With HMD's; Proceedings of VRST–94; World Scientific Publishing Co.; River Rigeg, 1994; pp. 159–173.

Bryson, Steve; Measurement and calibration of static distortion of position data from 3D trackers; SPIE vol. 1669; Stereoscopic Displays and Applications III (1992); pp. 244–255.

*Primary Examiner*—Mark Hellner
*Attorney, Agent, or Firm*—Cumpston & Shaw

[57] ABSTRACT

A multi-dimensional tracking sensor for tracking a moving transmitter with particular applications in virtual reality and other real time computer applications. The system employs an electro-magnetic (EM) tracking sensor having a small lightweight transmitter with a transmitting antenna located on the target to be tracked and an array receiver with several local stationary antenna elements. Multiple antenna elements of the array receiver lie on the perimeter of the measured space in positions determined by a self-calibration procedure. The proposed device calculates a cross correlation function between two signals at each receiving unit to determine a spatial position of the tracked element via a system of linear equations.

10 Claims, 6 Drawing Sheets

MULTI-DIMENSIONAL TRACKING SENSOR

This application claims priority to Provisional Application Ser. No. 60/002,866, filed Aug. 28, 1995.

FIELD OF THE INVENTION

The present invention relates to tracking systems and more particularly to a multidimensional tracking system employing relative low frequency signals thereby permitting structural penetration of a tracking signal.

BACKGROUND OF THE INVENTION

The problem of creating at least three degree-of-freedom (3D) tracking devices is a long-standing one. There has been a variety of attempts to determine the position and movement of a target. For example, global positioning system (GPS), receives a signal from at least four satellites and provides the position of the receiver. Loran C operates on a similar principle, but is based on ground deployed radio beacons. Many tracking systems have developed to track moving vehicles. Most of these systems employ either directional antennas or rely on a comparison of the phase of the arriving signal to the different parts of a multi-section antenna. While these systems perform well in their applications, either speed, accuracy or cost may prohibit their employment in real time computer applications.

A relatively large number of electromagnetic (EM) trackers are available for computer applications. Most of these EM trackers are based on near field EM propagation. Polhemus Incorporated pioneered the field of AC magnetic trackers and holds many patents since 1977. Ascension Corporation has developed a DC magnetic tracker that is less prone to interference from metal. A variety of ultrasonic trackers is also known. In the field of optical tracking, the pioneering work done at the University of North Carolina has shown the efficacy of this method. Mechanical devices and a combination of inertial-global positioning systems have also been developed to determine the position and orientation of objects.

While research is still being conducted in all of these fields, these technologies are relatively mature. However all of these techniques, while highly evolved, are subject to limitations that are inherent to each method. No single current technology is able to meet the requirements demanding computer applications require.

Prior systems also are subject to the limitation that a receiver must be located within a line of sight of each position in which the transmitter is to be tracked. That is, in buildings, a receiver is required in each room and any connecting halls that are not within a single line of sight. This restriction requires that a significant number of receivers be employed. The high number of receivers increases the cost of the system as well as installation and maintenance costs.

The need for a multidimensional tracking sensor is rapidly growing, and expanding into previously unrelated technologies. Specifically, the recent development of virtual reality equipment has generated an emphasis on a short range tracking sensors for a helmet mounted display (HMD). In addition, these short range tracking sensors are finding applications in automobile crash testing where geometrical data is logged directly during the test. Further, the short range tracking sensors may find application in the medical field for rehabilitation and injury claims where the device can track movement of the human body. The variety of uses for multidimensional tracking sensors is very diverse, and includes animation, tele-operation, and training simulation. As the enabling hardware technology becomes further refined, it is anticipated the number of applications will multiply. The recent increases in performance and cost effectiveness of digital signal processing and data converter products have increased the feasibility of electromagnetic (EM) correlation techniques in the field of multidimensional position tracking.

SUMMARY OF THE INVENTION

The present method for the multidimensional tracking of an object includes fixing five receivers at spaced apart locations; moving a transmitter connected to the object with respect to the five receivers; receiving a transmitted signal at each of the receivers; and solving a linear equation in response to the received signals to track movement of the transmitter. In a further configuration, the method includes generating an internal receiver signal for each receiver. It is also contemplated the method may employ generating a convolution between signals from each receiver.

With respect to the apparatus, the present invention for the multi-dimensional tracking of an object includes five spaced apart receivers. A single reference signal is supplied to each receiver. The receivers generate an internal receiver signal which self convolution having a single global maximum within a measured time interval; a transmitter moveable relative to the receivers, the transmitter generating a signal which self convolution has a single global maximum within the maximum measured time interval; and a digital signal processor solving a linear equation in response to signals received by the receivers to track movement of the transmitter.

The present method and apparatus do not suffer from the obvious tradeoffs and built in limitations of other approaches. The range of the present multi-dimensional tracking system is limited only by the power of the transmitter. This allows the present device to exceed the requirements for current applications by several orders of magnitude. Also, the present device is not a subject to line-of-sight restrictions, nor is the tracked unit restricted to certain (generally upright) orientations. A further advantage is a low latency due to the short time of flight for the signal. Metallic, ferrometallic, or CRT devices may be present near the tracked unit without causing significant interference. This robust technique can be employed in a wide variety of computer applications where known methods have limited uses.

DETAILED DESCRIPTION OF THE PREFERRED EMBODIMENTS

Figure 1:
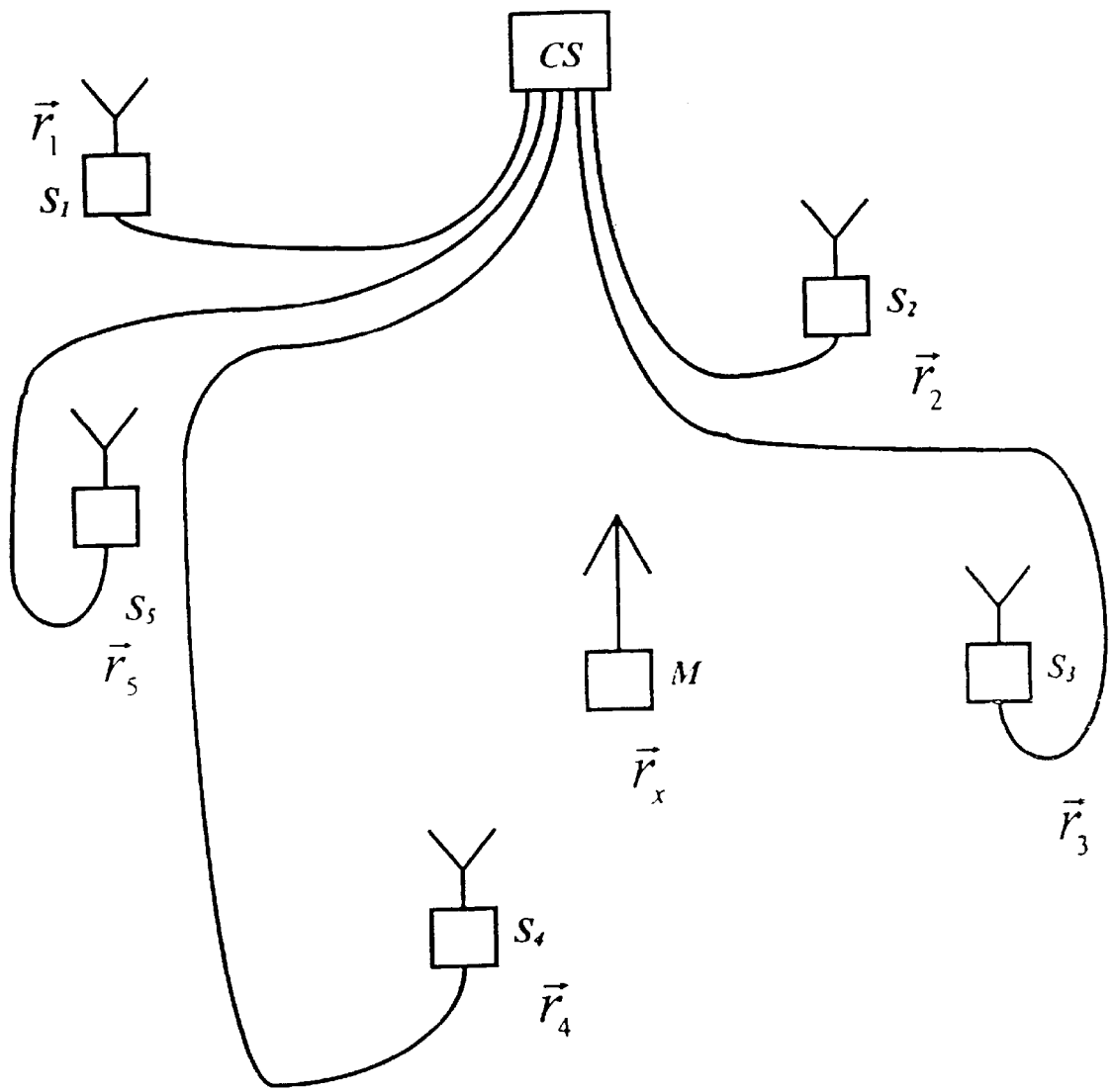
FIG. 1 is a schematic of a basic configuration of the system.

Referring to FIG. 1, the present invention may be used for the multi-dimensional tracking of an object. In particular, the device determines a position vector of a tracked object M relative to a plurality of stationary units $S_n$, and employs a reconstruction method and a calibration method. Particularly, the tracked unit includes a transmitter for generating a carrier signal and each stationary unit includes an antenna element thus forming a receiver array.

To determine the position of the transmitter moving in a cube (or three dimensional space), it is sufficient to measure the differences between a propagation time of a carrier signal from the transmitter to each stationary antenna element of a receiver array. If the number of antenna elements is larger than the number of dimensions by at least one, that is, four antenna elements for three dimensional measurement, then the differences in propagation time at each antenna element determine two concurrent position points of which only one is correct. However, further raising the number of antenna elements by at least one, that is five antenna elements for three dimensional tracking, it is possible to uniquely determine a position of the target. Both configurations have practical applications in that they can locate the tracked object, however, the system with more antenna elements has the additional advantages of an over-determined system and a much faster reconstruction algorithm.

Apparatus

The system includes a plurality of the stationary units $S_n$, a movable transmitting unit M and a control system. Each of the stationary units $S_n$ is a receiver with an antenna element. The stationary units $S_n$ are located to form a receiver array. The movable unit M includes a transmitter for generating an electromagnetic transmitting signal which self convolution has a single global maximum within a maximum measured time interval. The control system includes a digital signal processor capable of solving a linear equation in response to signals received by the receivers to track movement of the transmitting unit M.

Although described in terms of stationary receiving units $S_n$ and a movable transmitting unit M, it is understood the present invention may be employed with stationary transmitters and a movable receiver.

As shown in FIG. 1, the proposed multi-dimensional tracking system includes a minimum of five stationary units $S_n$ for three dimensional tracking measurements. Each of the five stationary units $S_n$ includes the corresponding antenna element and thus forms a portion of the receiver array. For purposes of the disclosure, $\vec{r}_n$ is the position vectors of the corresponding stationary unit $S_n$ as determined by the calibration procedure. Each stationary unit includes a receiver.

The movable unit M is the transmitter antenna for which position vector $\vec{r}_x$ is to be measured. The transmitted signal may be any of a variety of frequencies, such as 918 MHz. The transmitter includes a transmitter antenna. The transmitter generates an electromagnetic signal which self convolution has a single global maximum within a measured time interval.

In addition, the present tracking system includes a data acquisition and control system (CS). The CS is a digital signal processor capable of rapid data collection. A typical digital signal processor is a programmable ASIC 7C381 and DSP ADSP-2101 as manufactured by Cyprys Semiconductor and Analog Devices, respectively. The CS performs not only all the signal processing functions but also the reconstruction algorithm of the position vector $\vec{r}_x$. The CS further includes a low noise amplifier (LNA) for amplifying the received signal $S_n(t, \omega, \phi)$ and a local code generator (LG) in which the signals $S_{LI}(t, \omega, \phi)$ and $S_{LQ}(t, \omega, \phi)$ are mixed. LG has similar structure to the transmitter with the additional ability to adjust parameters $\omega$, $\phi$ of the signals $S_{LI}(t, \omega, \phi)$ and $S_{LQ}(t, \omega, \phi)$.

Generally, the signal processor has a number of matched filters and non coherent detectors equal to the plurality of receivers. A mixer in the receiver multiplies the received signal by an internal receiver signal for each receiver, and the signal processor optimizes the product with a transfer function in a corresponding matched filter that minimizes the energy of any signal uncorrelated with the product of the received signal and the internal receiver signal. In another step, the signal processor cross correlates signals from the matched filters. Also, the signal processor adjusts the phase ($\phi$) and frequency ($\omega$) of the code generator (LG) using a non coherent detector procedure.

The stationary units $S_n$ are spread over the area of interest forming the best possible triangulation pattern for the anticipated measurements. This triangulation area can be very small or very large, ranging from meters to many kilometers. The dispersal pattern for the stationary units $S_n$ is nonrestrictive; and therefore, any convenient location is satisfactory. Thus, contrary to the prior line of sight restricted systems requiring a receiver in each area to be monitored, the present system permits the dispersion of stationary units $S_n$ over a sufficiently large area to obviate the need for a multitude of units. Thus, depending upon the building size, as few as one, two or three units may be disposed on a given floor. In fact, it is possible that only the minimum five units could be located about a single building to provide tracking coverage for the entire building. As the movable unit M is moved to the various points of interest, the CS is dynamically calculating the absolute position of $\vec{r}_x$. Preferably, the stationary units encompass a volume of space in which the movable unit is to be tracked. That is, the movable unit moves within a space that is intermediate at least two stationary units.

Figure 2:
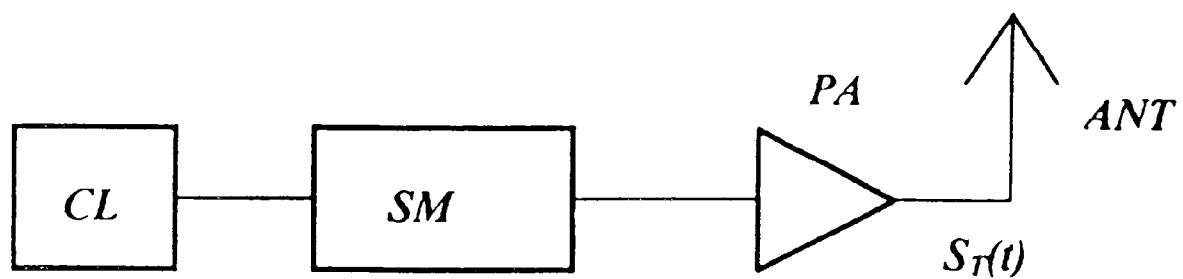
FIG. 2 is a block diagram of the transmitter circuit.

The combination of the moveable transmitting unit M and the stationary units $S_n$ forms a conventional telemetric channel. Referring to FIG. 2, the transmitter includes a system clock (CL) and a field programmable gate array chip that performs a state machine (SM) type function. If the system is required to operate at a frequency higher than the maximum clocking speed of the chip, than the output signal can be mixed with a high frequency carrier or preferably multiplied by an amplifier (MU) operating deeply in C class. The signal from the MU is sent to the power amplifier (PA) followed by the omnidirectional antenna (ANT). It is believed that in many applications of short distance multi-dimensional tracking, the blocks MU and PA can be omitted.

A transmitted signal can employ any time domain function $S_T(t)$ that sufficiently satisfies a principle:

$$\int_{\mathfrak{J}} ([S_T(t)])^2 dt > \int_{\mathfrak{J}} [S_T(t) * S_T(\tau - t)] dt$$

for any $\tau \neq nT$ and $\tau \in \mathfrak{J}$ where:

n is an integer

T is a period of $S_T(t)$ $\mathfrak{J}$ is the area of possible signal delays

The $S_T(t)$ is generally known and dependent on limited set of unknown parameters (usually frequency and phase $\omega$, $\phi$). As an example $S_T(t, \omega, \phi)$ can be represented by sinusoidal carrier modulated by Gold's sequence using Biphase-Shift Keying modulation (Direct Sequence Spread Spectrim communication). For some applications, the receiver can have lock-in capabilities allowing small changes of $\tau$. In these cases $\mathfrak{J}$ could be relatively small and the signal $S_T(t, \omega, \phi)$ can be represented even by the continuous wave (CW) employing a narrow bandwidth communication. However, narrow bandwidth communication is applicable in certain situations, but this type of communication is not suitable in a multi-path propagation environment. If the multi-path propagation has significant influence or if applications require a rapid position measurement of several transmitters, then the lock-in capabilities are not available and $S$ has to cover all measured space. In those, cases the condition (1) should be valid for all values of potential propagation's delays.

Figure 3:
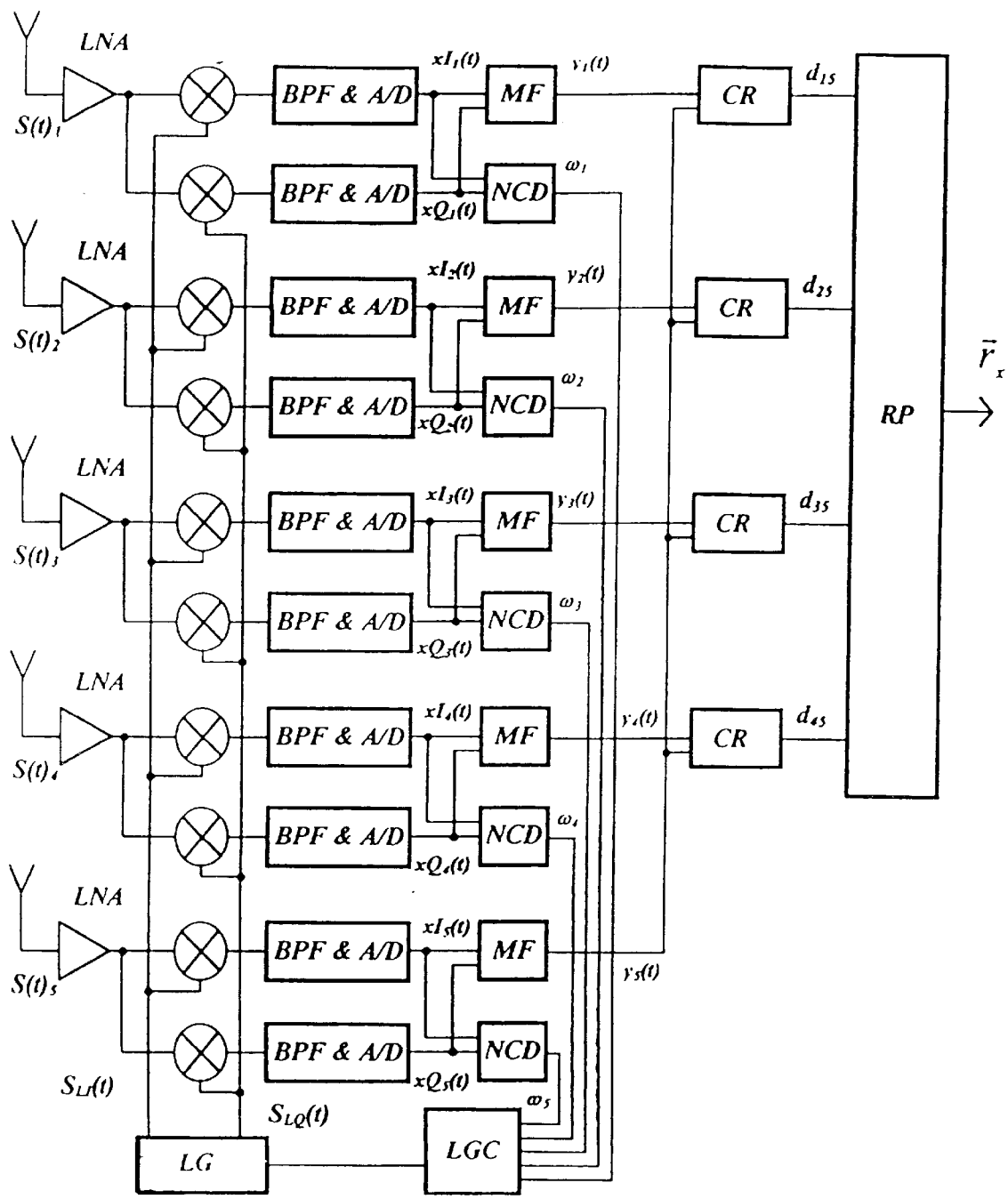
FIG. 3 is a block diagram of the receiver circuit.

The time-of-flight of the transmitted signal is proportional to the length of the propagation path (distance), which is ultimately a function of speed of the light. The receiver system is comprised of several antenna elements and has the capability of simultaneous or coherent reception of the transmitted signal from all its elements in the array receiver. The signal received by the n-th element (stationary unit $S_n$) of the receiver array can be described as:

$$S_n(t, \omega, \phi) = \sum_l I_{l,n} S_T \left\{ \left[ t - \left( \tau_n + \frac{d_{l,n}}{c} \right) \right], \omega, \phi \right\}$$

where:
$I_{l,n}$ is an unknown propagation coefficient of l-th propagation path to n-th antenna.
$\tau_n$ is generally unknown but constant inherent receiver's delay of the n-th element
$d_{l,n}$ is the unknown distance of the l-th propagation path from the transmitter antenna to n-th element of the receiver antenna FIG. 3 shows an example of the receiver circuit. Each receiver compares a received signal with one reference signal or internal signal. The received signal $S_n(t, \omega, \phi)$ is amplified in a low noise amplifier (LNA) and mixed with the signals $S_{LI}(t, \omega, \phi)$ and $S_{LQ}(t, \omega, \phi)$ from a local code generator (LG). LG has similar structure to the transmitter with the additional ability to adjust parameters $\omega$, $\phi$ of the signals $S_{LI}(t, \omega, \phi)$ and $S_{LQ}(t, \omega, \phi)$. Similarly like $S_T(t, \omega, \phi)$, $S_{LI}(t, \omega, \phi)$ and $S_{LQ}(t, \omega, \phi)$ has to fulfill following principles:

$$\int_{\Im} [S_T(t) * S_{LI,Q}(\tau_0 - t)] dt > \int_{\Im} [S_T(t) * S_{LI,Q}(\tau_1 - t)] dt$$

and $$\int_{\Im} [S_{LI}(t) * S_{LQ}(\tau - t)] dt \approx 0$$

for any $\tau_0 = nT + d_0$ and $\tau_1 \neq \tau_0$ and $\tau \in \Im$
where: $d_0$—unknown coefficient to be determined which is a measure of the propagation time.

Following the mixer, the signal passes through the analog band pass filter (BPF) combined with a $\Delta\Sigma$ type of analog to a digital (A/D) converter. The mixer, LG and BPF form a first stage of Wiener filter, where the square root of an uncorrelated signal is minimized by the adjustment of the $\omega_0$, $\phi_0$ parameters. Further operations are performed exclusively by a digital signal processor (DSP).

Figure 4:
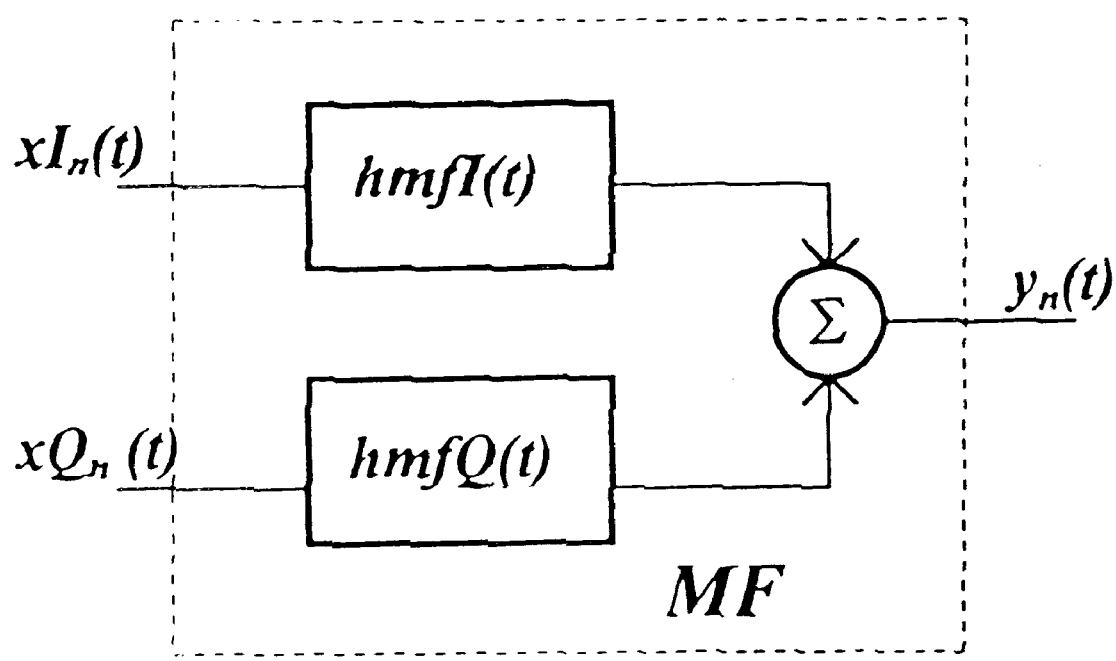
FIG. 4 is a block diagram of the matched filter block diagram.

The signal $xI_n$ and $xQ_n$ from each A/D converter is passed to a linear match filter (MF) which block diagram is shown on FIG. 4. The matched filters are coherent detectors, as set forth in L. M. Garth, H. V. Poor, Detection of Non-Guassian Signals: A Paradigm for modern Statistical Signal Processing, Proceedings of IEEE Vol. 82, No. 7, 1994. Impulse responses of the filter hmfI(t) and hmfQ(t) are described as:

$$hmfI(t) \approx S_T(t, \omega, \phi) \otimes S_{LI}[t(1+\alpha), \omega_0, \phi_0]$$

$$hmfQ(t) \approx S_T(t, \omega, \phi) \otimes S_{LQ}[t(1+\alpha), \omega_0, \phi_0]$$

where:
$\otimes$—convolution operator
$\alpha$—known time scale factor
$\omega_0$, $\phi_0$—estimated values for $\omega$, $\phi$, Functions $y_m(t)$ and $Y_n(t)$ from each matched filter MF are cross correlated by CR. The maximum of cross correlation function $R_{mn}(\tau)$ of $y_m(t)$ and $Y_n(t)$ corresponds to the difference between the propagation time $\tau_{m,n}$ of the received signals $S_M(t, \omega, \phi)$ and $S_N(t, \omega, \phi)$.

In a multi-path propagation case the cross correlation function $R_{mn}(\tau)$ will have several local maxims. Many researchers published data indicating that, if line-of-sight exists, the direct propagation will exceed the reflection/refraction propagation by approximately 20 dB (indoor environment). In this case, the system should search for global maximum of $R_{mn}(\tau)$ to calculate $\tau_{m,n}$. Similarly, even if line-of-sight does not exists, but scattering of the transmitted signal is symmetrically distributed along a receiver axis (random medium), then the global maximum of $R_{mn}(\tau)$ will approximate to $\tau_{m,n}$. of a direct propagation path.

The time differences $\tau_{m,n}$ are re-scaled by the speed of light c to obtain the measurements in the spatial domain $d_{m,n} = \tau_{m,n} * c$ That is, the differences between the lengths of the transmitted signal propagation paths are determined. Values of $d_{m,n}$ from each channel are treated as an output signal from the array receiver and they form matrix D, a base input to the reconstruction procedure (RP).

Figure 5:
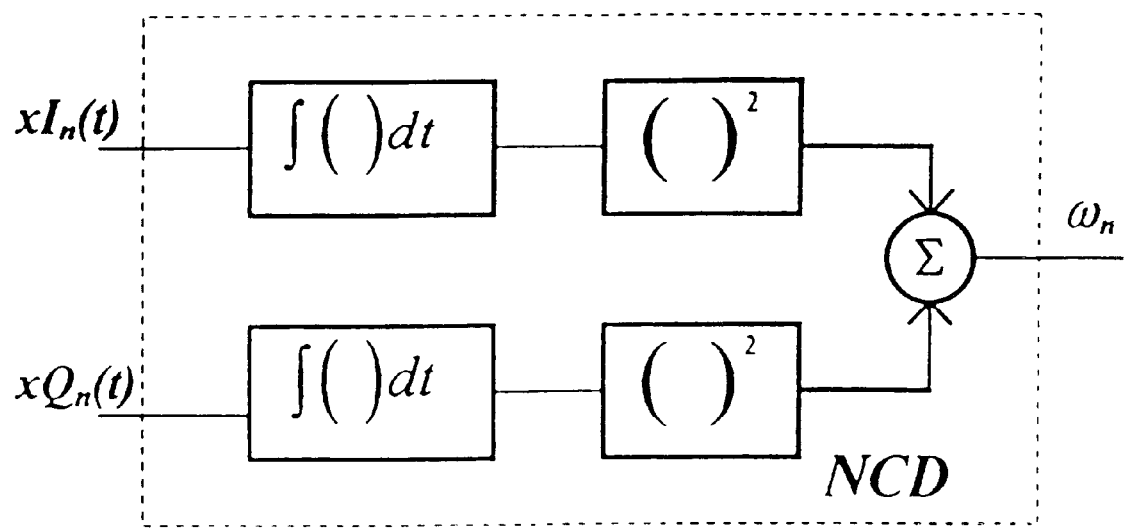
FIG. 5 is a block diagram of the noncoherent detector.

To estimate the value of propagation independent parameter (or parameters) of $S_T(t, \omega, \phi)$ (usually frequency $\omega$) the receiver of the stationary unit uses a non coherent detector (NCD) as shown on FIG. 5. Based on information from the NCD, local generator regulator (LGR) adjusts the local code generator LG for optimum shape of $S_{LI}(t, \omega, \phi)$ and $S_{LQ}(t, \omega, \phi)$.

Reconstruction Procedure

The reconstruction procedure takes the output of the receiver $D = [d_{m,n}]$ which is the measured differences in length between propagation paths from each neighboring channel and calculates the position vector of the tracked unit $\vec{r}_x$. The present reconstruction procedure employs system of linear equations to resolve $\vec{r}_x$ base on data $D = [d_{m,n}]$. The following equation can be used to reconstruct the position vector $\vec{r}_x$:

$$\vec{r}_x \cdot 2(\vec{r}_S - \vec{r}_1) + d_{1S} v = |\vec{r}_S|^2 - |\vec{r}_1|^2 + d_{1S}^2$$

$$\vec{r}_x \cdot 2(\vec{r}_S - \vec{r}_2) + d_{2S} v = |\vec{r}_S|^2 - |\vec{r}_2|^2 + d_{2S}^2$$

$$\vec{r}_x \cdot 2(\vec{r}_S - \vec{r}_3) + d_{3S} v = |\vec{r}_S|^2 - |\vec{r}_3|^2 + d_{3S}^2$$

$$\vec{r}_x \cdot 2(\vec{r}_S - \vec{r}_4) + d_{4S} v = |\vec{r}_S|^2 - |\vec{r}_4|^2 + d_{4S}^2$$

Figure 6:
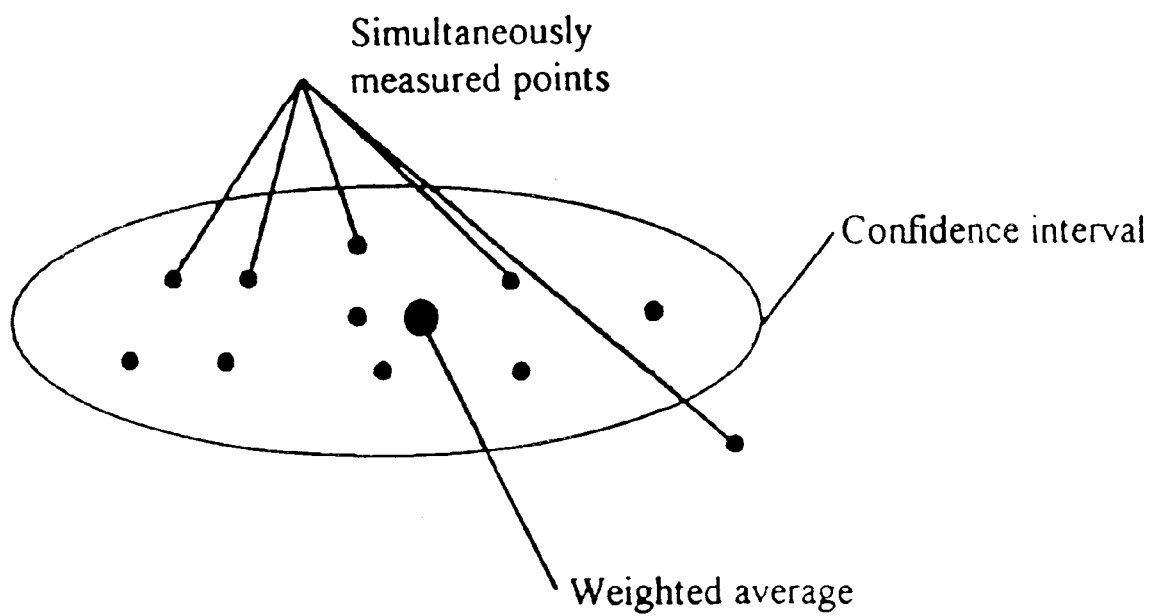
FIG. 6 is a schematic of expected value and confidence interval of vector $\vec{r}_x$ from a simultaneous measurements.

·—vector scalar product
v—unknown arbitrary scalar variable
$\vec{r}_n$—position vector of n-th antenna component
$d_{mn}$—signal from receiver Equation (5) can be rewritten in its matrix form:

$$\begin{bmatrix} x_x \\ x_y \\ x_z \\ v \end{bmatrix} \times \begin{bmatrix} a_{1x} & a_{1y} & a_{1z} & d_{15} \\ a_{2x} & a_{2y} & a_{2z} & d_{25} \\ a_{3x} & a_{3y} & a_{3z} & d_{35} \\ a_{4x} & a_{4y} & a_{4z} & d_{45} \end{bmatrix} = \begin{bmatrix} b_1 \\ b_2 \\ b_3 \\ b_4 \end{bmatrix} + \begin{bmatrix} d_{15}^2 \\ d_{25}^2 \\ d_{35}^2 \\ d_{45}^2 \end{bmatrix} \qquad \text{equation (6)}$$

where: x.–$\xi$ th coordinate of vector $\vec{r}_x$ $a_{n\xi}$-th coordinate of vector $2(\vec{r}_5 - \vec{r}_n)$ $b_n = |\vec{r}_5|^2 - |\vec{r}_n|^2$ Using the proposed procedure in three dimensions, a minimum five channel receiver array is required. That is, five stationary units $S_n$ are employed. Many direct numerical methods are known to solve the equation (6). The system (6) is over-determined so there are five combinations of this form. Further improvements can be achieved by adding more antenna elements, usually through the addition of additional stationary units $S_n$. In a fully deterministic case, all solutions should have exactly the same value. However, in non deterministic conditions (noisy environment, multi-path propagation, jamming) the over-determined measurement gives an additional ability to calculate the weighted center—the expected value of the vector $\vec{r}_x$ and the confidence interval—error of the measurement. (FIG. 6)

Calibration Procedure

The calibration procedure allows to completely determine the structure of the reconstruction equation and thus $\vec{r}_x$.

To apply the reconstruction procedure of equation (6), the elements $a_{n\xi}$ and $b_n$ of the matrixes must be known. One method is to measure the coordinates of each $S_n$ unit and apply the findings to calculate the matrix elements. This direct method requires not only the employment of the independent positioning system but also all measurement errors will create additional inaccuracy in the tracking device.

A more efficient method is to measure the elements of matrixes directly using a calibration procedure. This procedure is based on several measurements of the values of $d_{mn}$ for different and known positions of the unit M. The unknown vector $\vec{r}_x$ in equation (6) will be substituted by several known vectors $\vec{r}_{xi}$. At least $$\frac{(\xi+1)^2}{\xi}$$

measurements are required to fully determine equation (6), where $\xi$ is dimension. Thus, for three dimensions 6 measurements must be taken. All measurements have to be sufficiently spread and linearly independent, such that no three measurement positions lie on a straight line. The calibration process can employ a still fixture and the transmitter can be placed at each of its corners. The measurements will be taken separately at each position of the transmitter.

The linear equation (6) can be rewritten in the form:

$$X \times A + v \times D - B = D^2$$

$$X = \begin{bmatrix} x_x \\ x_y \\ x_z \\ v \end{bmatrix} \qquad A = \begin{bmatrix} a_{1x} & a_{1y} & a_{1z} & d_{15} \\ a_{2x} & a_{2y} & a_{2z} & d_{25} \\ a_{3x} & a_{3y} & a_{3z} & d_{35} \\ a_{4x} & a_{4y} & a_{4z} & d_{45} \end{bmatrix} \qquad D = \begin{bmatrix} d_{15} \\ d_{25} \\ d_{35} \\ d_{45} \end{bmatrix}$$

$$B = \begin{bmatrix} b_1 \\ b_2 \\ b_3 \\ b_4 \end{bmatrix} \qquad D^2 = \begin{bmatrix} d_{15}^2 \\ d_{25}^2 \\ d_{35}^2 \\ d_{45}^2 \end{bmatrix}$$

For tracking in three dimensions, at least six measurements has to be taken deriving the following system of equations:

$$\begin{bmatrix} X_1 \\ X_2 \\ X_3 \\ X_4 \\ X_5 \\ X_6 \end{bmatrix} \times \begin{bmatrix} A & 0 & 0 & 0 & 0 & 0 \\ 0 & A & 0 & 0 & 0 & 0 \\ 0 & 0 & A & 0 & 0 & 0 \\ 0 & 0 & 0 & A & 0 & 0 \\ 0 & 0 & 0 & 0 & A & 0 \\ 0 & 0 & 0 & 0 & 0 & A \end{bmatrix} + [\Re] \times$$

$$\begin{bmatrix} D_1 & 0 & 0 & 0 & 0 & 0 \\ 0 & D_2 & 0 & 0 & 0 & 0 \\ 0 & 0 & D_3 & 0 & 0 & 0 \\ 0 & 0 & 0 & D_4 & 0 & 0 \\ 0 & 0 & 0 & 0 & D_5 & 0 \\ 0 & 0 & 0 & 0 & 0 & D_6 \end{bmatrix} \begin{bmatrix} B \\ B \\ B \\ B \\ B \\ B \end{bmatrix} = \begin{bmatrix} D_1^2 \\ D_2^2 \\ D_3^2 \\ D_4^2 \\ D_5^2 \\ D_6^2 \end{bmatrix}$$

where:

$X_k$—coordinates of M unit at k-th measurement $D_k$—value of D at k-th measurement $D_K^2$ value of $D^2$ at k-th measurement $\Re$—6×1 matrix of unknown variables The relation (8) is a 24 by 22 system of linear equations and it can be solved using one of many known linear algebra methods.

The elements $a_{n\xi}$ and $b_n$ of matrixes A and B from equation (8) found during calibration can be applied directly to the reconstruction relation (6).

Therefore, the present method allows determination of the absolute position of $\vec{r}_x$ without requiring the solution of quadratic equations. The use of linear equations and the over determined nature of the system allows the real time location of a tracked object.

An embodiment of the tracking system tracks one moveable transmitter with provisions to track multi-moveable transmitters. The tracking system complies with part 18 FCC regulation in HF spectrum. The transmitter operates at a frequency of 27.205 MHz, which is within ISM assign bandwidth. The frequency is not synthesized (crystal controlled), so to change this frequency, the transmitter and receiver crystals have to be changed. Power delivered to the antenna is in range of 25 dBm. This power is sufficient for the required range in open space environment. If substantially more range is needed or penetration through walls is required, power could be raised by employing a standard HF amplifier (linear). FCC allows unlimited power at that frequency. The system includes: a transmitter, an array receiver antenna, RF/DSP front-end unit and the main computer unit. Data can be exchanged using a standard RS232 port.

The present invention may also be embodied in alternative configurations which allow the tracking of multiple transmitters.

There are two ways to increase the number of tracked transmitters within a given system. The first option is to increase the number of RF/DSP units so each unit tracks one transmitter. The number of elements in the antenna array and computer unit will not change, as these units can be used to track many transmitters simultaneously. This option does not decrease the speed or quality of tracking and only one block (RF/DSP unit) per transmitter has to be added.

A second option is to track multiple transmitters sequentially. The advantage of this option is that it does not require any changes to the already developed hardware. For this option the tracking speed will decrease substantially in comparison with the first option or single tracked transmitter. Not only will each transmitter be tracked one at the time, but a substantial additional time will be needed to initially lock the receiver into each transmitter. Initial locking time will depend on signal strength and it could take several seconds for each transmitter.

To embed a unique ID code into each transmitter the circuit uses programmable device—microcontroller. The controller can be programmed and reprogrammed no more than 100 times, consequently the ID code has to be assigned to each transmitter permanently.

A small digital receiver block may be placed inside the transmitter unit. This block may be used to establish a more reliable communication protocol (similar to ALE protocol used by the government). The block's size is 1.6×0.6×0.2 inch w/o local oscillator and draws approximately 10 mA.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims. That is, The position reconstruction method for tracking system that is based on estimations of signal time arrival that uses over-determined system and at least one additional variable that allows to use a linear system of equations.

I claim:

1. A tracking apparatus, comprising:
    (a) a movable transmitter whose position is to be tracked, the transmitter generating an electromagnetic transmitter signal whose self convolution has a single global maximum within a measured time interval;
    (b) at least five stationary receivers for receiving the transmitted signal, each receiver comparing the received signal with an internal reference signal having a convolution with a single global maximum within the measured time interval; and
    (c) a digital signal processor having a number of matched filters equal to the plurality of receivers, and configured to optimize a product of the reference signal and the received signal with a transfer function in a corresponding matched filter that minimizes the energy of any signal uncorrelated with the product of the received signal and the internal receiver signal, and cross correlate signals from the matched filters.

2. The apparatus of claim 1, wherein the digital signal processor estimates at least one coefficient of a transmitted signal in response to the product of the received signal and the internal reference signal, independent of a delay in receiving the signal.

3. The apparatus of claim 1, wherein the digital signal processor includes a non coherent detector.

4. The apparatus of claim 2, wherein the estimated coefficient is sufficient to allow generation of an internal reference signal to be matched with a received signal.

5. A method of tracking a transmitter, comprising:
    (a) generating from the transmitter an electromagnetic signal whose self convolution has a single global maximum within a maximum measured time interval;
    (b) disposing at least five receivers in a spaced apart stationary array;
    (c) generating at least one internal reference signal having a convolution with a single global maximum within the maximum measured time interval in each receiver;
    (d) multiplying for each receiver the received signal by the internal reference signal to generate a product;
    (e) optimizing the product in a matched filter corresponding to the receiver that minimizes the energy of any signal that is uncorrelated to the product of the received signal and the internal reference signal; and
    (f) cross correlating the signals from the matched filters.

6. The method of claim 5, further comprising estimating a coefficient of the transmitted signal in response to the product of the received signal and the internal reference signal, independent of any propagation delay and an unknown.

7. The method of claim 5, further comprising basing estimations of signal time arrival derived from an over-determined system and at least one additional variable for providing solution by a system of linear equations.

8. A method of tracking a transmitter, comprising:
    (a) fixing five receivers at spaced apart locations;
    (b) moving a transmitter with respect to the five receivers and generating a self convolution electromagnetic transmitting signal having a single global maximum within a maximum measured time interval in the transmitter;
    (c) receiving a transmitted signal at each of the receivers; and
    (d) solving a system of linear equations in response to the received signals to track movement of the transmitter.

9. The method of claim 8, further comprising generating an internal reference signal in each receiver.

10. A system for tracking a transmitter, comprising:
    (a) five spaced apart receivers, each receiver generating an internal reference signal having a single global maximum within a measured time interval;
    (b) a transmitter moveable relative to the receivers, the transmitter generating a self convolution electromagnetic transmitting signal having a single global maximum within the maximum measured time interval; and
    (c) a signal processor solving a linear equation in response to signals received by the receivers to track movement of the transmitter.

* * * * *